(12) United States Patent
Kim et al.

(10) Patent No.: US 10,755,856 B2
(45) Date of Patent: Aug. 25, 2020

(54) MULTILAYER CERAMIC ELECTRONIC COMPONENT

(71) Applicant: SAMSUNG ELECTRO-MECHANICS CO., LTD., Suwon-Si, Gyeonggi-do (KR)

(72) Inventors: Do Yeon Kim, Suwon-Si (KR); Je Jung Kim, Suwon-Si (KR); Do Young Jeong, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 88 days.

(21) Appl. No.: 16/200,643

(22) Filed: Nov. 26, 2018

(65) Prior Publication Data

US 2020/0118748 A1 Apr. 16, 2020

(30) Foreign Application Priority Data

Oct. 10, 2018 (KR) ........................ 10-2018-0120591

(51) Int. Cl.
*H01G 4/012* (2006.01)
*H01G 4/30* (2006.01)
*H01G 4/232* (2006.01)
*H01G 4/12* (2006.01)

(52) U.S. Cl.
CPC ............. *H01G 4/012* (2013.01); *H01G 4/232* (2013.01); *H01G 4/30* (2013.01); *H01G 4/1227* (2013.01)

(58) Field of Classification Search
CPC .......... H01G 4/012; H01G 4/232; H01G 4/30; H01G 4/1227
See application file for complete search history.

(56) References Cited

U.S. PATENT DOCUMENTS

| 8,072,732 | B2 * | 12/2011 | Sato | ...................... H01G 4/232 361/303 |
| 2006/0203420 | A1 * | 9/2006 | Okuyama | .............. H01G 4/232 361/271 |
| 2007/0145449 | A1 * | 6/2007 | Sato | ........................ H01G 4/38 257/295 |
| 2012/0019981 | A1 * | 1/2012 | Yoshida | .............. H01L 41/0472 361/321.1 |

(Continued)

FOREIGN PATENT DOCUMENTS

JP 2006-237078 A 9/2006
KR 10-2015-0096909 A 8/2015

*Primary Examiner* — Dion Ferguson
(74) *Attorney, Agent, or Firm* — Morgan, Lewis & Bockius LLP

(57) ABSTRACT

A multilayer ceramic electronic component includes: a ceramic body including a dielectric layer and first and second internal electrodes alternately exposed to first and second outer surfaces with the dielectric layer interposed therebetween; and first and second external electrodes disposed on the first and second outer surfaces of the ceramic body so as to be connected to the first and second internal electrodes, respectively. The ceramic body further includes a protective layer including a protective layer dummy electrode disposed on at least one of upper and lower portions of the first and second internal electrodes, and the protective layer dummy electrode has a thickness ranging from greater than to 1.2 times or less a thickness of each of the first and second internal electrodes.

10 Claims, 3 Drawing Sheets

(56) References Cited

U.S. PATENT DOCUMENTS

| | | | |
|---|---|---|---|
| 2012/0075766 A1* | 3/2012 | Nishioka | H01G 4/005 361/301.4 |
| 2015/0096795 A1* | 4/2015 | Hong | H01G 4/30 174/260 |
| 2019/0172646 A1* | 6/2019 | Kim | H01G 4/1245 |
| 2020/0043663 A1* | 2/2020 | Kim | H01G 4/12 |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2018-0120591 filed on Oct. 10, 2018 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic electronic component has been widely used as a component of an information technology (IT) device such as a computer, a personal digital assistant (PDA), a cellular phone, or the like, since it has a small size, implements high capacitance, and may be easily mounted. A multilayer ceramic electronic component has also been widely used as an electrical component, since it has high reliability and high strength characteristics.

Since the multilayer ceramic electronic component is widely used in electric components, warpage endurance and tensile endurance of the multilayer ceramic electronic component are becoming more important.

SUMMARY

An aspect of the present disclosure may provide a multilayer ceramic electronic component with improved warpage endurance and/or tensile endurance.

According to an aspect of the present disclosure, a multilayer ceramic electronic component may include: a ceramic body including a dielectric layer and first and second internal electrodes alternately exposed to first and second outer surfaces with the dielectric layer interposed therebetween; and first and second external electrodes disposed on the first and second outer surfaces of the ceramic body so as to be connected to the first and second internal electrodes, respectively. The ceramic body may further include a protective layer including a protective layer dummy electrode disposed on at least one of upper and lower portions of the first and second internal electrodes, and the protective layer dummy electrode has a thickness ranging greater than to 1.2 times a thickness of each of the first and second internal electrodes.

According to another aspect of the present disclosure, a multilayer ceramic electronic component may include: a ceramic body including a dielectric layer and first and second internal electrodes alternately exposed to first and second outer surfaces with the dielectric layer interposed therebetween; and first and second external electrodes disposed on the first and second outer surfaces of the ceramic body so as to be connected to the first and second internal electrodes, respectively. The ceramic body may further include a protective layer including a protective layer dummy electrode disposed on at least one of upper and lower portions of the first and second internal electrode, the number of stacked protective layer dummy electrodes per unit length in a thickness direction may be larger than the number of stacked first and second internal electrodes per unit length in a thickness direction of the ceramic body, and each of the plurality of protective layer dummy electrode may have a thickness ranging from greater than 0 to 0.6 times a thickness of each of the first and second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

Figure 1:
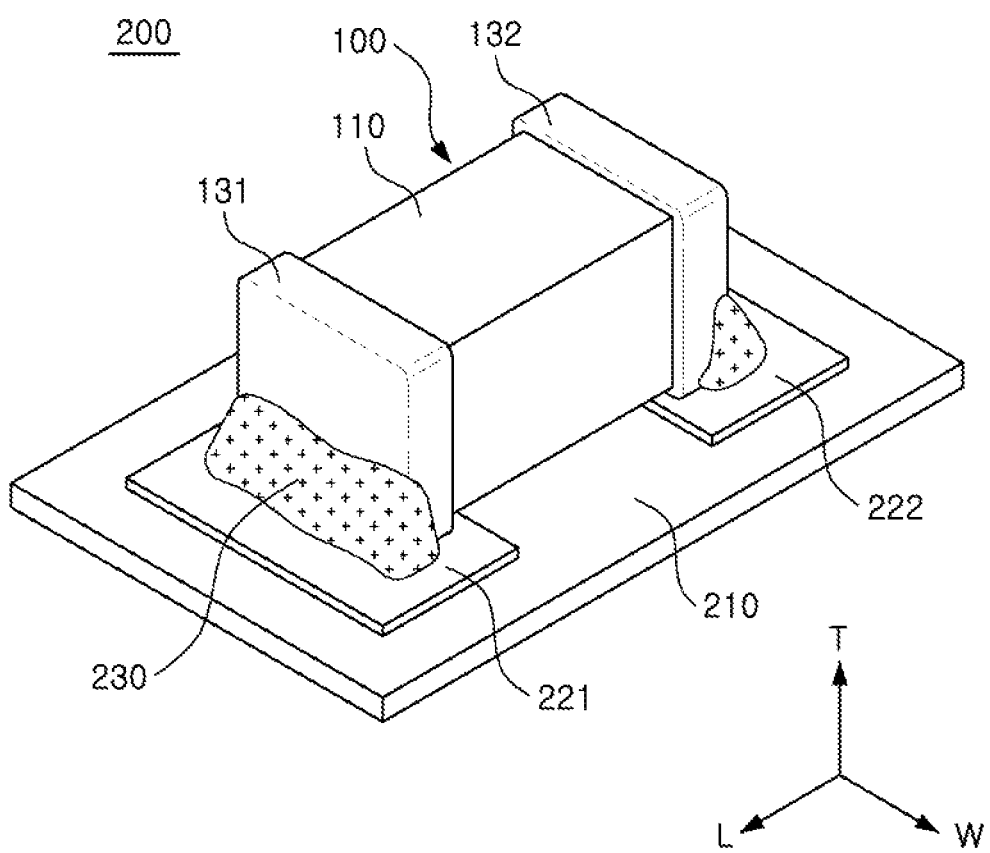
FIG. 1 is a perspective view showing a multilayer ceramic electronic component according to an exemplary embodiment of the present disclosure and a mounting thereof.

FIG. 1 is a perspective view showing a multilayer ceramic electronic component according to an exemplary embodiment of the present disclosure and a mounting thereof.

Referring to FIG. 1, a multilayer ceramic electronic component 100 according to an exemplary embodiment of the present disclosure may include a ceramic body 110 and first and second external electrodes 131 and 132, in which the multilayer ceramic electronic component 100 may be mounted (200) on first and second electrode pads 221 and 222 on a board 210.

The ceramic body 110 may be formed of a hexahedron having opposite end surfaces in a length direction L, opposite side surfaces in a width direction W, and opposite side surfaces in a thickness direction T. The ceramic body 110 may be formed by stacking a plurality of dielectric layers in the thickness direction T and then sintering the plurality of dielectric layers. A shape and a dimension of the ceramic body 110 and the number (one or more) of stacked dielectric layers are not limited to those illustrated in the present exemplary embodiment.

The plurality of dielectric layers disposed in the ceramic body 110 may be in a sintered state, and adjacent dielectric layers may be integrated with each other so that boundaries therebetween are not readily apparent without using a scanning electron microscope (SEM).

For example, the ceramic body 110 may have a form in which eight corners of the hexahedron are round. Therefore, durability and reliability of the ceramic body 110 may be improved, and structural reliability of the first and second external electrodes 131 and 132 at the corners may be improved.

The dielectric layer may have a thickness arbitrarily changed in accordance with a capacitance design of the multilayer ceramic electronic component 100, and may include ceramic powders having a high dielectric constant, such as barium titanate ($BaTiO_3$) based powders or strontium titanate ($SrTiO_3$) based powders. However, a material of the dielectric layer according to the present disclosure is not limited thereto. In addition, various ceramic additives, organic solvents, plasticizers, binders, dispersants, and the like, may be added to the ceramic powders according to an object of the present disclosure.

An average particle size of the ceramic powders used to form the dielectric layer is not particularly limited, and may be controlled in order to accomplish an object of the present disclosure. For example, the average particle size of the ceramic powders used to form the dielectric layer may be controlled to be 400 nm or less. Therefore, the multilayer ceramic electronic component 100 according to an exemplary embodiment in the present disclosure may be used as a component that needs to be miniaturized and have a high capacitance, such as an information technology (IT) component.

For example, the dielectric layers may be formed by applying and then drying slurry including powders such as barium titanate ($BaTiO_3$) powders, or the like, to carrier films to prepare a plurality of ceramic sheets. The ceramic sheets may be formed by mixing ceramic powders, a binder, and a solvent with one another to prepare slurry and manufacturing the slurry in a sheet shape having a thickness of several micrometers by a doctor blade method, but are not limited thereto.

The first and second external electrodes 131 and 132 may be disposed on outer surfaces (for example, one surface and the other surface in the length direction) of the ceramic body 110 to be connected to the first and second internal electrodes, respectively, and may be configured to electrically connect the first and second internal electrodes 121 and 122 and a board to each other.

For example, the first and second external electrodes 131 and 132 may be formed of copper (Cu), palladium (Pd), platinum (Pt), gold (Au), silver (Ag), lead (Pb) or the like, or alloys thereof.

For example, the first and second external electrodes 131 and 132 may include first and second electrode layers including Cu or Ni and first and second plating layers disposed on the first and second electrode layers and including Ni or Sn.

The first and second electrode layers may be formed by a method of dipping the ceramic body 110 in a paste including a metal component or a method of printing a conductive paste including a conductive metal on at least one surface of the ceramic body 110 in the length direction L, and may also be formed by a sheet transfer method or a pad transfer method.

The first and second plating layers may be formed by sputtering or an electric deposition, but the first and second plating layers are not limited by the above methods.

The first and second external electrodes 131 and 132 may be electrically connected to the first and second electrode pads 221 and 222 by first and second solders 230. For example, the first and second solders 230 may be more closely coupled to the first and second external electrodes 131 and 132 according to a reflow process.

Figure 2:
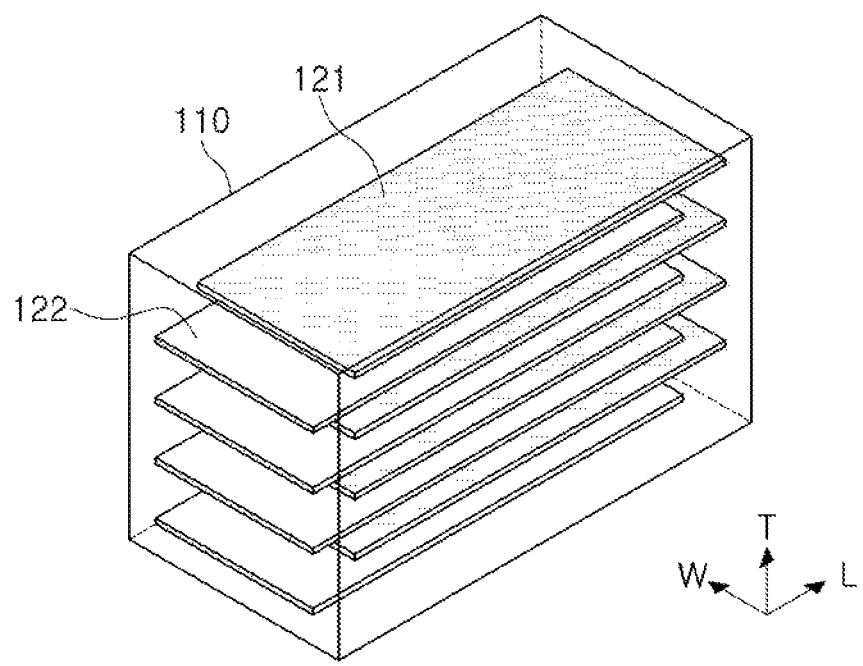
FIG. 2 is a perspective view showing a form of an internal electrode of the multilayer ceramic electronic component according to an exemplary embodiment of the present disclosure.

FIG. 2 is a perspective view showing a form of an internal electrode of the multilayer ceramic electronic component according to the exemplary embodiment of the present disclosure.

Referring to FIG. 2, the ceramic body 110 may include the first and second internal electrodes 121 and 122, and the dielectric layer disposed between the first and second internal electrodes 121 and 122.

The first and second internal electrodes 121 and 122 are stacked so as to be alternately exposed to the first and second outer surfaces (for example, one end surface and the other end surface in the length direction) with the dielectric layer interposed therebetween so as to have different polarities.

The first internal electrodes 121 and the second internal electrodes 122 may be formed to be alternately exposed to one end surface and the other end surface of the ceramic body 110 in the length direction L of the ceramic body 110 in the stack direction of the dielectric layers by printing a conductive paste including a conductive metal, and may be electrically insulated from each other by each of the dielectric layers disposed therebetween.

That is, the first and second internal electrodes 121 and 122 may be electrically connected to the first and second external electrodes 131 and 132 formed on opposite end surfaces of the ceramic body 110 in the length direction L of the ceramic body 110 through portions alternately exposed to the opposite end surfaces of the ceramic body 110 in the length direction of the ceramic body 110, respectively.

For example, the first and second internal electrodes 121 and 122 may have an average particle size of 0.1 to 0.2 μm, and may be formed of a conductive paste for an internal electrode including 40 to 50 wt % of conductive metal powders, but are not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body 110.

Therefore, when voltages are applied to the first and second external electrodes, electric charges may be accumulated between the first and second internal electrodes 121 and 122 facing each other. In this case, a capacitance of the multilayer ceramic electronic component 100 may be in proportion to an area of a region in which the first and second internal electrodes 121 and 122 overlap each other.

That is, when the area of the region in which the first and second internal electrodes 121 and 122 overlap each other is significantly increased, a capacitance may be significantly increased even in a capacitor having the same size.

Thicknesses of the first and second internal electrodes 121 and 122 may be determined depending on the purpose, and may be, for example, 0.4 μm or less. In addition, the number of layers of the first and second internal electrodes 121 and 122 may be 400 or more. Therefore, the multilayer ceramic electronic component 100 may be used as a component that needs to be miniaturized and have a high capacitance, such as an information technology (IT) component.

Since the thickness of the dielectric layer corresponds to an interval between the first and second internal electrodes 121 and 122, the smaller the thickness of the dielectric layer, the greater the capacitance of the multilayer ceramic electronic component 100.

The conductive metal included in the conductive paste forming the first and second internal electrodes 121 and 122 may be nickel (Ni), copper (Cu), palladium (Pd), silver (Ag), lead (Pb), or platinum (Pt), or alloys thereof. However, the conductive metal according to the present disclosure is not limited thereto.

The larger the interval between the first and second internal electrodes 121 and 122, the more the withstand voltage characteristics of the ceramic body 110 may be improved.

When the multilayer ceramic electronic component 100 requires high withstand voltage characteristics such as electrical components, the multilayer ceramic electronic component 100 may be designed so that an average thickness of the dielectric layers is twice as large as that of the first and second internal electrodes 121 and 122. Accordingly, the multilayer ceramic electronic device 100 may have the high withstand voltage characteristics so as to be used as electrical components.

In addition, the durability (for example, warpage endurance) of the ceramic body 110 may have high reliability when the width of the ceramic body 110 exceeds 0.5 times the thickness thereof.

Figure 3:
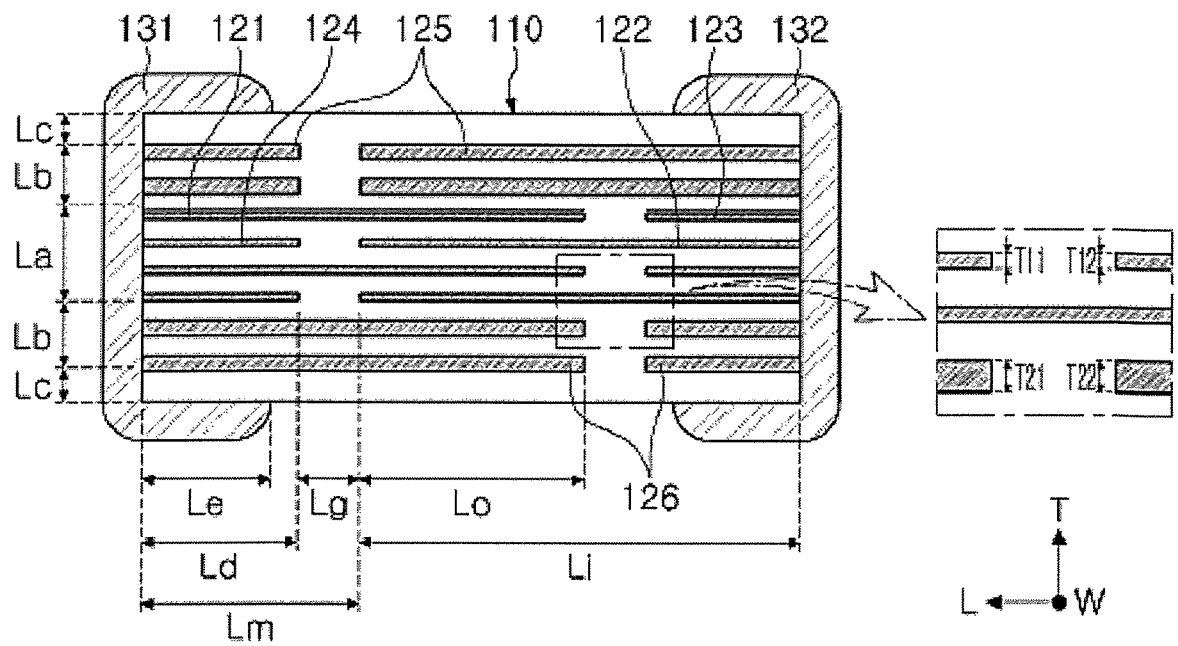
FIG. 3 is a side view of the multilayer ceramic electronic component according to the exemplary embodiment of the present disclosure having a thick protective layer dummy electrode.

FIG. 3 is a side view of the multilayer ceramic electronic component according to the exemplary embodiment of the present disclosure having a thick dummy electrode.

Referring to FIG. 3, a length of the first and second internal electrodes 121 and 122 may be Li, a length of the ceramic body 110 may be (Li+Lm), and a length of the region in which the first and second internal electrodes 121 and 122 overlap each other may be Lo.

The ceramic body 110 may further include a protective layer disposed on at least one of upper and lower portions of the first and second internal electrodes 121 and 122. Accordingly, the ceramic body 110 may improve durability against external impact (warpage, tensile, or the like).

The protective layer has a thickness of (Lb+Lc) when disposed only on one of the upper and lower portions of the first and second internal electrodes 121 and 122, and has a thickness of {2*(Lb+Lc)} when disposed on both the upper and lower portions thereof. The thickness of the ceramic body 110 is {2*(Lb+Lc)+La}. Here, La refers to a thickness of a capacitance forming region in which the first and second internal electrodes 121 and 122 are alternatively disposed with the dielectric layer therebetween, Lc refers to a thickness of an exterior portion of the protective layer, in which upper protective layer dummy electrodes 125 or lower protective layer dummy electrodes 126 are not disposed, and Lb refers to a thickness of an inner portion of the protective layer, in which the upper protective layer dummy electrodes 125 or the lower protective layer dummy electrodes 126 are disposed.

The protective layer may include at least one of an upper protective layer dummy electrode 125 disposed over the first and second internal electrodes 121 and 122 and a lower protective layer dummy electrode 126 disposed under the first and second internal electrodes 121 and 122.

The upper and lower protective layer dummy electrodes 125 and 126 may include the same material as the first and second internal electrodes 121 and 122, and may be stacked by the same process while having a shape similar to that of the first and second internal electrodes 121 and 122, but the shape of the upper and lower protective layer dummy electrodes 125 and 126 is not limited thereto.

Generally, ceramic may be a brittle material, and therefore may be cracked or broken when subjected to a strong tensile stress.

Since the conductive material included in the upper and lower protective layer dummy electrodes 125 and 126 has a higher solidity than that of the general ceramic, the protective layer including the upper and/or lower protective layer dummy electrodes 125 and 126 may further improve the durability against the external impact (bending, tensile, or the like).

Unlike the first and second internal electrodes 121 and 122, the upper and lower protective layer dummy electrodes 125 and 126 may be designed focusing on strengthening the durability of the ceramic body 110 or suppressing the delamination without significantly contributing to the capacitance of the multilayer ceramic electronic component.

Therefore, the thickness of the upper and lower protective layer dummy electrodes 125 and 126 may be designed more freely than the first and second internal electrodes 121 and 122.

The thicker the upper and/or lower protective layer dummy electrodes 125 and 126, the stronger the strength against the external impact (warpage, tensile force, or the like) may be.

However, when the thickness of the upper and/or lower protective layer dummy electrodes 125 and 126 are too thick, a step difference between the upper and/or lower protective layer dummy electrodes 125 and 126 and the dielectric layer and a step difference between the first and second internal electrodes 121 and 122 may be further increased. If the step difference exceeds a limit, the delamination may be caused in the ceramic body 110.

The following Table 1 below shows the result of measuring the warpage endurance measurement and the result of measuring the delamination according to a ratio of T21 and T22 (thickness ratio) with respect to T11 and T12, in which T21 or T22 is a thickness of each of the upper and/or lower protective layer dummy electrodes 125 and 126, and T11 and T12 are a thickness of each of the first and second internal electrodes 121 and 122 and a thickness of each of dummy first and second dummy electrodes 123 and 124, respectively. T21 and T22 may be the same as each other, and T11 and T12 may be the same as each other. Here, the total number of the stacked first and second internal electrodes 121 and 122 is 94, and the thickness of the ceramic body 110 is the same in all cases.

TABLE 1

| Thickness ratio of T21 or T22 to T11 or T12 | The number of stacked dummy electrodes (Upper/Lower) | Occurrence frequency of cracks due to 6 mm warpage stress | | | Delamination |
|---|---|---|---|---|---|
| | | Width direction | Thickness direction | Total | |
| 0.8 | 54/54 | 3/30 | 1/30 | 4/60 | OK |
| 1.0 | 53/53 | 3/30 | 2/30 | 5/60 | OK |
| 1.2 | 52/52 | 2/30 | 0/30 | 2/60 | OK |
| 1.4 | 48/48 | 1/30 | 0/30 | 1/60 | NG |

Referring to Table 1, the multilayer ceramic electronic component according to an embodiment of the present disclosure includes the upper and/or lower protective layer dummy electrodes 125 and 126 having the thicknesses T21 and T22 ranging from greater than to 1.2 times the thickness T11 and T12 of the first and second internal electrodes 121 and 122, respectively, thereby suppressing the delamination in the ceramic body 110 while having the strong strength for the external impact (warpage, tensile, or the like).

The larger the thickness of the ceramic body 110, the smaller the number of the stacked upper and/or lower protective layer dummy electrodes 125 and 126, so that the substantial size of the ceramic body 110 is not increased.

That is, the number of the stacked upper and/or lower protective layer dummy electrodes 125 and 126 per unit length in the thickness direction may be smaller than the number of the stacked first and second internal electrodes 121 and 122 per unit length in the thickness direction.

Meanwhile, referring to FIG. 3, the ceramic body 110 may further include first and second dummy electrodes 123 and 124 spaced from each other from the first and second internal electrodes 121 and 122 in the length direction, respectively. The first and second dummy electrodes 123 and 124 may be disposed on a level the same as the first and second internal electrodes 121 and 122, respective, and may be electrically connected to the second and first external electrodes 131 and 132, respectively. A spacing distance between the first and second internal electrodes 121 and 122 and the first and second dummy electrodes 123 and 124 in the length direction may be Lg. A length of the first and second dummy electrodes 123 and 124 may be Ld, and may be longer than an extending length Le of the first and second external electrodes 131 and 132 in the length direction.

At least a part of the upper and/or lower protective layer dummy electrodes 125 and 126 may overlap the first and second dummy electrodes 123 and 124 when viewed in the thickness direction.

Accordingly, the delamination due to the step difference between the first and second internal electrodes 121 and 122 may be suppressed.

A portion of the upper protective layer dummy electrode 125 connected to the second external electrode 132 may overlap the space between the first internal electrode 121 and the first dummy electrode 123.

A portion of the lower protective layer dummy electrode 126 connected to the first external electrode 131 may overlap the space between the second internal electrode 122 and the second dummy electrode 124.

Accordingly, the distribution of the conductive material of the ceramic body 110 based on the length direction may be more balanced, so that the ceramic body 110 can have a more stable strength against the external impact (warpage, tensile, or the like).

The upper and/or lower protective layer dummy electrodes 125 and 126 may have the thicknesses T21 and T22 ranging from greater than to 1.2 times the thickness T11 and T12 of the first and second dummy electrodes 123 and 124, respectively.

Accordingly, the multilayer ceramic electronic component according to an exemplary embodiment of the present disclosure may suppress the delamination in the ceramic body 110 while having strong strength against external impact (warpage, tensile, or the like).

Figure 4:
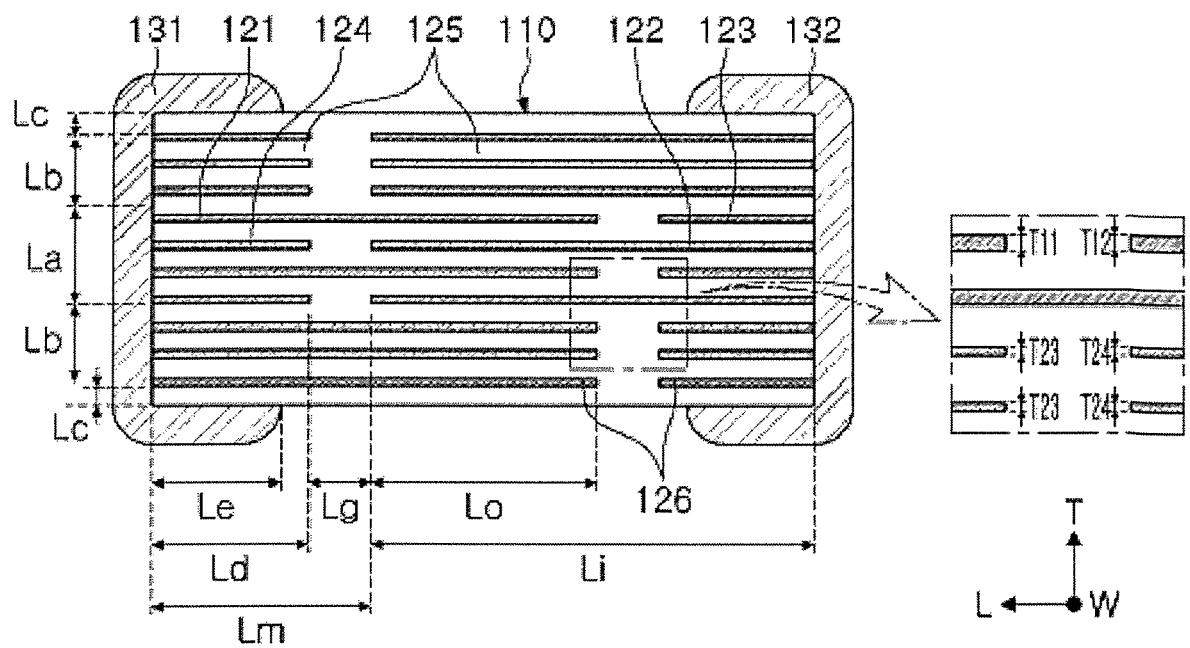
FIG. 4 is a side view of the multilayer ceramic electronic component according to the exemplary embodiment of the present disclosure having a thin protective layer dummy electrode.

FIG. 4 is a side view of the multilayer ceramic electronic component according to the exemplary embodiment of the present disclosure having a thin dummy electrode.

Referring to FIG. 4, the upper and/or lower protective layer dummy electrodes 125 and 126 may have thicknesses T23 and T24 smaller than the thicknesses T11 and T12 of the first and second internal electrodes 121 and 122.

Accordingly, the number of the stacked upper and/or lower protective layer dummy electrodes 125 and 126 per unit length in the thickness direction may be larger than the number of the stacked first and second internal electrodes 121 and 122 per unit length in the thickness direction.

Accordingly, the upper and/or lower protective layer dummy electrodes 125 and 126 may have the stronger strength against the external impact (warpage, tensile force, or the like).

The following Table 2 below shows the result of measuring the warpage endurance and the result of measuring the delamination according to a ratio of T23 and T24 (thickness ratio) with respect to T11 and T12, in which T23 or T24 is a thickness of each of the upper and/or lower protective layer dummy electrodes 125 and 126, and T11 and T12 are a thickness of each of the first and second internal electrodes 121 and 122 and a thickness of each of the first and second dummy electrodes 123 and 124, respectively. T23 and T24 may be the same as each other, and T11 and T12 may be the same as each other. Here, the total number of the stacked first and second internal electrodes 121 and 122 is 94, and the thickness of the ceramic body 110 is the same in all cases.

TABLE 2

| Thickness ratio of T23 or T24 to T11 or T12 | The number of stacked dummy electrodes (upper/lower) | Occurrence frequency of cracks due to 6 mm warpage stress | | | Delamination |
|---|---|---|---|---|---|
| | | Width direction | Thickness direction | Total | |
| 0.4 | 60/60 | 0/30 | 0/30 | 0/60 | OK |
| 0.6 | 57/57 | 0/30 | 0/30 | 0/60 | OK |
| 0.8 | 54/54 | 3/30 | 1/30 | 4/60 | OK |
| 1.0 | 53/53 | 3/30 | 2/30 | 5/60 | OK |

Referring to Table 2, the multilayer ceramic electronic device according to an embodiment of the present disclosure includes the upper and/or lower protective layer dummy electrodes 125 and 126 having the thicknesses T23 and T24 ranging from greater than 0 to 0.6 times the thickness T11 of the first and second internal electrodes 121 and 122, respectively, thereby suppressing the delamination in the ceramic body 110 while having the strong strength for the external impact (warpage, tensile, or the like).

A volume ratio (for example, {Lb−T23*(the number of stacked dummy electrode)/Lb}) from the uppermost layer to the lowermost layer of the plurality of upper or lower protective layer dummy electrodes 125 and 126 may be larger than that (for example, {La−T11/(the number of stacked internal electrodes)/La}) of the first and second internal electrodes from the uppermost layer to the lowermost layer among the first and second internal electrodes 121 and 122.

Accordingly, the ratio of the conductive material of the protective layer is higher than that of the conductive material in the region where the first and second internal electrodes 121 and 122 are disposed, such that the multilayer ceramic electronic component may have the relatively stronger strength.

For example, when the upper and/or lower protective layer dummy electrodes 125 and 126 have the thickness T23 and T24 which range from 0.4 times to 0.6 times the thickness T11/T12 of the first and second internal electrodes 121 and 122, respectively, the multilayer ceramic electronic component may have the strong strength without excessively increasing the number of stacked upper and/or lower protective layer dummy electrodes 125 and 126.

Here, the upper and/or lower protective layer dummy electrodes 125 and 126 may have the thicknesses T23 and T24 which range from 0.4 times to 0.6 times the thickness T11/T12 of the first and second dummy electrodes 123 and 124, respectively.

As set forth above, according to the embodiment in the present disclosure, the multilayer ceramic electronic component may have the further improved warpage endurance and/or tensile endurance and suppress the occurrence of the delamination, without the substantial increase in volume.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a ceramic body including a dielectric layer and first and second internal electrodes alternately exposed to first and second outer surfaces with the dielectric layer interposed therebetween; and
   first and second external electrodes disposed on the first and second outer surfaces of the ceramic body so as to be connected to the first and second internal electrodes, respectively,
   wherein the ceramic body further includes a protective layer including a protective layer dummy electrode disposed on at least one of upper and lower portions of the first and second internal electrodes, and
   the protective layer dummy electrode has a thickness ranging from greater than to 1.2 times a thickness of each of the first and second internal electrodes.

2. The multilayer ceramic electronic component of claim 1, wherein the number of stacked protective layer dummy electrodes is plural, and
   the number of stacked protective layer dummy electrodes per unit length in a thickness direction of the ceramic body is smaller than the number of stacked first and second internal electrodes per unit length in the thickness direction.

3. The multilayer ceramic electronic component of claim 2, wherein the ceramic body further includes first and second dummy electrodes spaced apart from each other from the first and second external electrodes in a length direction, respectively, and
   at least portions of the protective layer dummy electrodes overlap the first and second dummy electrodes when viewed in the thickness direction.

4. The multilayer ceramic electronic component of claim 3, wherein the protective layer dummy electrode includes an upper protective dummy electrode disposed over the first and second internal electrodes and a lower protective layer dummy electrode disposed under the first and second internal electrodes,
   one of the upper and lower protective layer dummy electrodes is connected to the second external electrode, and overlaps a space between the first internal electrode and the first dummy electrode when viewed in the thickness direction of the ceramic body, and
   the other of the upper and lower protective layer dummy electrodes is connected to the first external electrode, and overlaps a space between the second internal electrode and the second dummy electrode when viewed in the thickness direction of the ceramic body.

5. The multilayer ceramic electronic component of claim 3, wherein each of the protective layer dummy electrodes has the thickness ranging from greater than to 1.2 times a thickness of each of the first and second dummy electrodes.

6. A multilayer ceramic electronic component comprising:
   a ceramic body including a dielectric layer and first and second internal electrodes alternately exposed to first and second outer surfaces with the dielectric layer interposed therebetween; and
   first and second external electrodes disposed on the first and second outer surfaces of the ceramic body so as to be connected to the first and second internal electrodes, respectively;
   wherein the ceramic body further includes a protective layer including a plurality of protective layer dummy electrodes disposed on at least one of upper and lower portions of the first and second internal electrodes
   the number of stacked protective layer dummy electrodes per unit length in a thickness direction of the ceramic body is larger than the number of stacked first and second internal electrodes per unit length in the thickness direction, and
   each of the plurality of protective layer dummy electrodes has a thickness ranging from greater than 0 to 0.6 times a thickness of each of the first and second internal electrodes.

7. The multilayer ceramic electronic component of claim 6, wherein the ceramic body further includes first and second dummy electrodes spaced apart from each other from the first and second external electrodes in a length direction, respectively, and
   at least portions of the plurality of protective layer dummy electrodes overlap the first and second dummy electrodes when viewed in the thickness direction.

8. The multilayer ceramic electronic component of claim 7, wherein the plurality of protective layer dummy electrodes include a plurality of upper protective dummy electrodes disposed over the first and second internal electrodes and a plurality of lower protective layer dummy electrodes disposed under the first and second internal electrodes,
   one of the plurality of upper and lower protective layer dummy electrodes is connected to the second external electrode, and overlaps a space between the first internal electrode and the first dummy electrode when viewed in the thickness direction of the ceramic body, and
   the other of the plurality of upper and lower protective layer dummy electrodes is connected to the first external electrode, and overlaps a space between the second internal electrode and the second dummy electrode when viewed in the thickness direction of the ceramic body.

9. The multilayer ceramic electronic component of claim 8, wherein a volume ratio from an uppermost layer to a lowermost layer of the plurality of upper or lower protective layer dummy electrodes is larger than that of the first and second internal electrodes from an uppermost layer to a lowermost layer among the first and second internal electrodes.

10. The multilayer ceramic electronic component of claim 8, wherein each of the plurality of protective layer dummy electrodes has a thickness, which is 0.4 times or more and 0.6 times or less the thickness of each of the first and second internal electrodes, and is 0.4 times or more and 0.6 times or less a thickness of each of the first and second dummy electrodes.

* * * * *